United States Patent
Kashino et al.

(10) Patent No.: US 12,087,274 B2
(45) Date of Patent: Sep. 10, 2024

(54) DATA GENERATION MODEL LEARNING APPARATUS, DATA GENERATION APPARATUS, DATA GENERATION MODEL LEARNING METHOD, DATA GENERATION METHOD, AND PROGRAM

(71) Applicants: NIPPON TELEGRAPH AND TELEPHONE CORPORATION, Tokyo (JP); The University of Tokyo, Tokyo (JP)

(72) Inventors: Kunio Kashino, Kanagawa (JP); Shota Ikawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 202 days.

(21) Appl. No.: 17/612,202

(22) PCT Filed: Apr. 8, 2020

(86) PCT No.: PCT/JP2020/015792
§ 371 (c)(1),
(2) Date: Nov. 17, 2021

(87) PCT Pub. No.: WO2020/241071
PCT Pub. Date: Dec. 3, 2020

(65) Prior Publication Data
US 2022/0246134 A1    Aug. 4, 2022

(30) Foreign Application Priority Data
May 24, 2019   (JP) ................................ 2019-097308

(51) Int. Cl.
*G10L 15/16*  (2006.01)
*G06F 16/31*  (2019.01)
(Continued)

(52) U.S. Cl.
CPC .............. *G10L 13/08* (2013.01); *G06F 16/31* (2019.01); *G10L 15/10* (2013.01); *G10L 15/16* (2013.01)

(58) Field of Classification Search
CPC ......... G10L 13/08; G10L 15/16; G10L 15/10; G10L 15/14; G10L 2015/081;
(Continued)

(56) References Cited

U.S. PATENT DOCUMENTS 11,100,296 B2 * 8/2021 Jeon ..................... G10L 15/22
2002/0147592 A1 * 10/2002 Wilmot ................. G10L 15/26
704/270.1

(Continued)

OTHER PUBLICATIONS

Kikuchi et al. (2016) "Output Length Control in Encoder-Decoder Model" IPSJ SIG Technical Report, vol. 2016-NL-227 No. 5, with English translation generated by computer.
(Continued)

*Primary Examiner* — Vijay B Chawan

(57) ABSTRACT

To provide techniques for generating, from a sound signal, a natural language representation corresponding to the sound signal while controlling a predetermined index for a natural language representation. A data generation apparatus 200 includes: a latent variable generation unit 210 that generates, from a sound signal, a latent variable corresponding to the sound signal using an encoder; and a data generation unit 220 that generates a natural language representation corresponding to the sound signal from the latent variable and a condition concerning an index for the natural language representation using a decoder.

14 Claims, 12 Drawing Sheets

(51) Int. Cl.
*G10L 13/08* (2013.01)
*G10L 15/10* (2006.01)

(58) Field of Classification Search
CPC ......... G10L 15/08; G10L 15/18; G06N 3/044;
G06N 3/084; G06N 3/08; G06F 40/56;
G06F 16/31; G06F 40/20; G06F 40/44
See application file for complete search history.

(56) References Cited

U.S. PATENT DOCUMENTS

| | | | |
|---|---|---|---|
| 2018/0151177 A1* | 5/2018 | Gemmeke | G10L 15/06 |
| 2018/0276540 A1* | 9/2018 | Xing | G06N 3/084 |
| 2019/0096386 A1* | 3/2019 | Li | G10L 13/00 |
| 2019/0197121 A1* | 6/2019 | Jeon | G10L 25/51 |
| 2019/0371291 A1* | 12/2019 | Sun | G10L 15/063 |
| 2020/0349975 A1* | 11/2020 | Krishnamurthy | G11B 27/34 |
| 2021/0365777 A1* | 11/2021 | Izadi | G06N 3/08 |
| 2022/0093082 A1* | 3/2022 | Zou | G06F 40/284 |
| 2022/0222450 A1* | 7/2022 | Kashino | G06N 3/08 |
| 2022/0246134 A1* | 8/2022 | Kashino | G10L 15/16 |

OTHER PUBLICATIONS

Ikawa et al. (2017) "Generating Onomatopoeia from Sound Signals with LSTM", IEICE technical report, vol. 117, No. 368, SP2017-58, pp. 17-20, Dec. 2017 with English translation generated by computer.

Ikawa et al. (2018) "Audio Signal Search with an Onomatopoeia Query based on the Latent Variables" Acoustical Society of Japan, 2018 Autumn Meeting Acoustical Society of Japan Oita University, Oita Sep. 12-14, 2018, CD-ROM 2-2-1, published on Aug. 29, 2018 with English translation generated by computer.

NTT News Release (2019) "Development of technology to explain sounds in words ~can dictate sounds other than the spoken voice of~" May 27, 2019, <URL : https://www.ntt.co.jp/news2019/1905/190527b.html> with English translation generated by computer.

NTT communication Science Laboratories Open House 2019 held on May 30-31, 2019, Booklet, <URL: http://www.kecl.ntt.co.jp/openhouse/2019/download.html > with its English translation generated by computer.

Ikawa et al. (2019) "Neural Audio Captioning Based on Conditional Sequence-To-Sequence Model" Detection and Classification of Acoustic Scenes and Events 2019, Oct. 25-26, 2019, New York, NY, USA, <URL: http://dcase.community/documents/workshop2019/proceedings/DCASE2019Workshop_Ikawa_82.pdf > <URL: http://dcase.community/articles/dcase2019-best-paper-awards>.

Xu et al. (2016) "Show, Attend and Tell: Neural Image Caption Generation with Visual Attention", arXiv, version 3, pp. 1-22, [Searched on Jan. 9, 2024] Internet: <URL: https://arxiv.org/abs/1502.03044>.

* cited by examiner

| NUMBER OF WORDS: HIGH | NUMBER OF WORDS: LOW |
|---|---|
| LOW, ECHOING SOUND | LOW SOUND |
| A SHORT WHISTLE BLOWS ONLY MOMENTARILY | A WHISTLE BLOWS |

HIGHER ⇐ ⇒ LOWER

| Sound source | Model | c | Generated captions |
|---|---|---|---|
| Snapping fingers | SCG | | A light sound is produced only momentarily. |
| | CSCG | 20 | Fingers are snapped. |
| | | 50 | Sound without pitch like a finger snap is produced once. |
| | | 80 | A short, light sound without pitch like a finger snap is produced once at low volume. |
| | | 110 | A short, light sound without pitch like a finger snap is produced once at low volume. |
| Bass drum | SCG | | A low sound echoes only momentarily. |
| | CSCG | 20 | A low sound is produced only momentarily. |
| | | 50 | A low hitting sound like a bang against Tatami booms only momentarily. |
| | | 80 | A drum is played only once at very low pitch unenthusiastically. |
| | | 110 | A light and a little low sound like hitting something is produced momentarily at very low pitch unenthusiastically and immediately goes off. |
| Contrabass | SCG | | A car engine echoes at low pitch. |
| | CSCG | 20 | A low sound is echoing. |
| | | 50 | A dull and low sound is echoing. |
| | | 80 | A slightly low machine sound gradually lowers and braking sound starts to be heard. |
| | | 110 | A slightly low machine sound gradually lowers and braking sound starts to be heard. |

FIG. 5

| MODEL | $c$ | MEAN | STANDARD DEVIATION |
|---|---|---|---|
| SCG | | 38.0 | 21.2 |
| CSCG | 20 | 21.7 | 2.4 |
| | 50 | 57.7 | 5.0 |
| | 80 | 90.5 | 9.5 |
| | 110 | 107.2 | 20.6 |

FIG. 6

DATA GENERATION MODEL LEARNING APPARATUS, DATA GENERATION APPARATUS, DATA GENERATION MODEL LEARNING METHOD, DATA GENERATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/015792, filed on 8 Apr. 2020, which application claims priority to and the benefit of JP Application No. 2019-097308, filed on 24 May 2019, the disclosures of which are hereby incorporated herein by reference in their entireties.

TECHNICAL FIELD

The present invention relates to techniques for generating, from a sound signal, a natural language representation such as a sentence corresponding to the sound signal.

BACKGROUND ART

Representing various sound events with natural language in an imitative manner is considered to play an important role in natural man-machine communication, search of a multimedia database, detection of abnormal sound, and the like. Techniques for representing a sound event with natural language in an imitative manner include an onomatopoeia generation technique described in Non-Patent Literature 1. According to the technique, a sound signal is received as input and onomatopoeia is generated as a sequence of phonemes corresponding to the sound signal by means of a neural network.

PRIOR ART LITERATURE

Non-Patent Literature

Non-Patent Literature 1: Shota Ikawa and Kunio Kashino, "Generating Onomatopoeia from Sound Signals with LSTM", IEICE technical report, vol. 117, no. 368, SP2017-58, pp. 17-20, December 2017.

SUMMARY OF THE INVENTION

Problems to be Solved by the Invention

However, onomatopoeic words generated by the technique described in Non-Patent Literature 1 have variations in their characteristics, for example, length (the number of phonemes forming an onomatopoeic word). In other words, it is difficult to generate onomatopoeia from a sound signal while controlling an index defined for onomatopoeia, such as the length of the onomatopoeia.

In general, it is difficult to generate desired data while controlling the characteristics of the data to be generated, such as onomatopoeia, namely a certain index defined for the data to be generated. In the following description, a language representation associated with natural language such as onomatopoeia, a phrase, and a sentence will be referred to as a natural language representation.

An object of the present invention is accordingly to provide techniques for generating, from a sound signal, a natural language representation corresponding to the sound signal while controlling a predetermined index for a natural language representation.

Means to Solve the Problems

An aspect of the present invention includes: a latent variable generation unit that generates, from a sound signal, a latent variable corresponding to the sound signal using an encoder; and a data generation unit that generates a natural language representation corresponding to the sound signal from the latent variable and a condition concerning an index for the natural language representation using a decoder.

Effects of the Invention

The present invention enables a natural language representation corresponding to a sound signal to be generated from the sound signal while controlling an index for the natural language representation.

BRIEF DESCRIPTION OF THE DRAWINGS

FIG. 5 shows experiment results.
FIG. 6 shows experiment results.

DETAILED DESCRIPTION OF THE EMBODIMENTS

Figure 1:
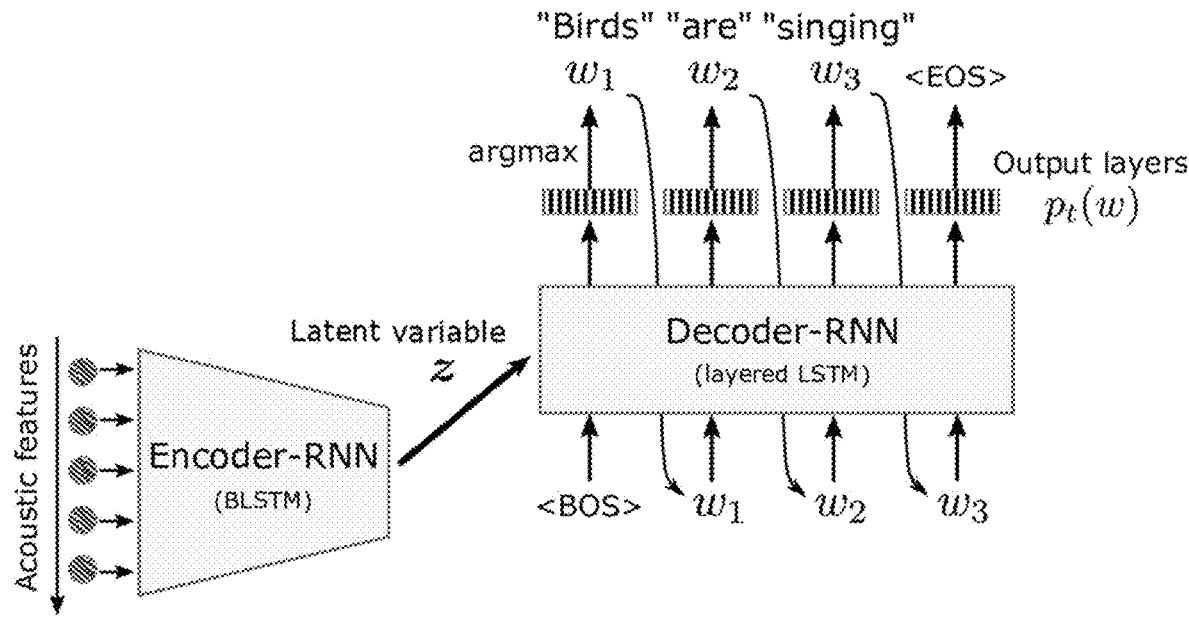
FIG. 1 illustrates an SCG.

Embodiments of the present invention are now described in detail. Components with the same functions are denoted with the same reference characters and overlapping descriptions are not repeated.

Prior to describing the embodiments, denotations used herein are described.

A "^" (caret) represents a superscript. For example, $x^{y^z}$ means that $y^z$ is a superscript to x and $x_{y^z}$, means that $y^z$ is a subscript to x. A "_" (underscore) represents a subscript. For example, $x^{y\_z}$ means that $y_z$ is a superscript to x and $x_{y\_z}$ means that $y_z$ is a subscript to x.

Although superscripts "^" and "~" like ^x or ~x for a certain letter x are supposed to be indicated right above "x", they are indicated as ^x and ~x due to limitations of text notation in a specification.

TECHNICAL BACKGROUND

Embodiments of the present invention use a sentence generation model when generating a sentence corresponding to a sound signal from the sound signal. A sentence generation model herein refers to a function that takes a sound signal as input and outputs a corresponding sentence. A sentence corresponding to a sound signal refers to a sentence that describes what kind of sound the sound signal represents (a descriptive sentence for the sound signal), for example.

First, as an example of the sentence generation model, a model called sequence-to-sequence caption generator (SCG) is shown.

<<SCG>>

The SCG is an encoder-decoder model that employs the recurrent language model (RLM) described in Reference Non-Patent Literature 1 as decoder, as shown in FIG. 1.

(Reference Non-Patent Literature 1: T. Mikolov, M. Karafiat, L. Burget, J. Cernock'y, and S. Khudanpur, "Recurrent neural network based language model", In INTERSPEECH 2010, pp. 1045-1048, 2010.)

The SCG is described with reference to FIG. 1. The SCG generates, from an input sound signal, a sentence corresponding to the sound signal through the following steps and outputs it. Instead of a sound signal, acoustic features extracted from the sound signal, for example, a sequence of Mel-frequency cepstrum coefficients (MFCC), may be used, for example. A sentence as text data is a sequence of words.

(1) The SCG extracts a latent variable z, which is a distributed representation of sound, from the sound signal via an encoder. The latent variable z is represented as a vector of predetermined dimensions (for example, 128 dimensions). The latent variable z can be said to be a summarized feature of the sound signal containing sufficient information for sentence generation. Accordingly, the latent variable z can also be said to be a fixed-length vector having both the features of the sound signal and those of the sentence.

(2) The SCG generates a sentence by sequentially outputting word $w_t$ at time t (t=1, 2, ...) from the latent variable z via the decoder. An output layer of the decoder outputs the word $w_t$ at time t based on a probability of generation $p_t(w)$ of a word at time t according to the following formula:

$$w_t = \underset{w}{\mathrm{argmax}}\, p_t(w)$$

FIG. 1 represents that word $w_1$ at time t=1 is "Birds", word $w_2$ at time t=2 is "are", and word $w_3$ at time t=3 is "singing", and the sentence "Birds are singing" is generated. <BOS> and <EOS> in FIG. 1 are a start symbol and an end symbol, respectively.

The encoder and the decoder constituting the SCG can be any kind of neural networks that can process time-series data. For example, a recurrent neural network (RNN) or a long short-term memory (LSTM) may be used. "BLSTM" and "layered LSTM" in FIG. 1 represent bi-directional LSTM and multi-layered LSTM, respectively.

The SCG is learned through supervised learning that uses pairs of sound signals and sentences corresponding to those sound signals (these sentences are referred to as teaching data) as supervised learning data. The SCG is learned by error backpropagation with an error function $L_{SCG}$, which is a total sum of cross entropies of the word output by the decoder at time t and the word at time t contained in a sentence as teaching data.

Sentences as output by the SCG resulting from such learning have variations in detailedness of their descriptions. This is due to the following reason. For one sound signal, there is more than one correct sentences. In other words, for one sound signal, there can be a number of "correct sentences" varying in detailedness of description. For example, for one sound signal, there can be multiple correct sentences that describe what the sound signal is like, such as "a low sound is produced", "a musical instrument is being played for a while", and "a stringed instrument starts to be played at low pitch and then the volume lowers slowly", and which one of these sentences is preferable depends on the scene. For example, in some scenes a brief description is desired, while in other scenes a detailed description is desired. Thus, if learning of the SCG is performed without discriminating sentences that are different in detailedness of description, the SCG would be unable to control trends in sentences to be generated.

<<Specificity>>

To resolve the problem of variations outlined above, specificity to serve as an index indicating the degree of detailedness of a sentence is defined. Specificity $I_s$ of a sentence s which is a sequence of n words $[w_1, w_2, \ldots, w_n]$ is defined by the following formula:

$$I_s = \sum_{t=1}^{n} I_{w_t}$$

Here, $I_{w\_t}$ is an information content of the word $w_t$, which is determined based on a probability of appearance $p_{w\_t}$ of the word $w_t$. For example, it may be $I_{w\_t} = -\log(p_{w\_t})$. The probability of appearance $p_{w\_t}$ of the word $w_t$ can be determined using a descriptive sentence database, for example. A descriptive sentence database is a database that stores one or more sentences describing each one of multiple sound signals, and the probability of appearance of a word can be determined by determining the frequency of appearance of each word contained in sentences included in the descriptive sentence database and dividing the frequency of appearance of that word by the sum of the frequencies of appearance of all the words.

Figure 2:
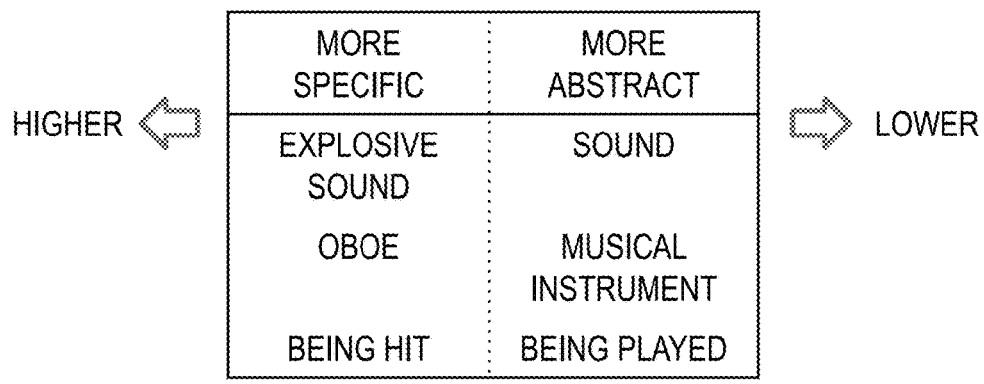
FIG. 2 illustrates specificity of a sentence.

Specificity defined in this manner has the following characteristics:

(1) Specificity is higher with a sentence that uses a word representing a specific object or action (see FIG. 2).

This is because such a word has a lower frequency of appearance and has higher information content.

Figures 3, 4:
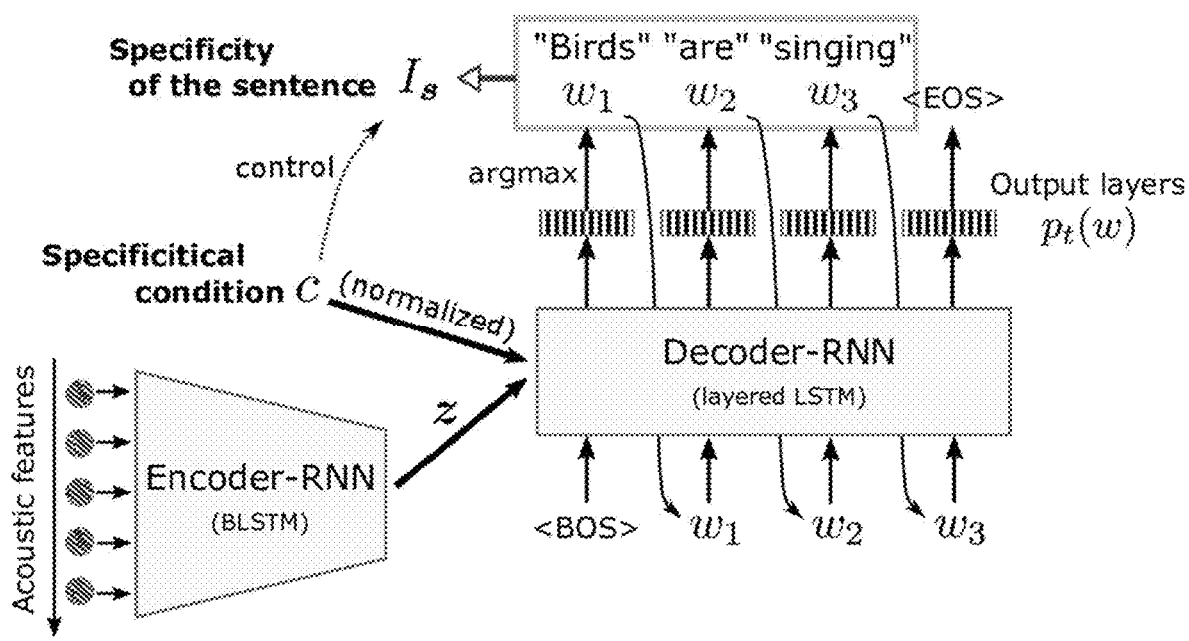
FIG. 3 illustrates specificity of a sentence.
FIG. 4 illustrates a CSCG.

(2) Specificity is higher with a sentence that uses a larger number of words (see FIG. 3).

An optimal value of specificity differs depending on the nature of a sound of interest or application. For example, when a sound should be depicted more specifically, the specificity of a sentence is preferably higher; whereas when a brief description is desired, the specificity of a sentence is preferably lower. As another problem, a sentence of high specificity tends to be inaccurate. Accordingly, it is important to be able to generate a sentence corresponding to a sound signal while freely controlling the specificity in accordance with granularity of information required for the description of the sound signal. As one model that enables such sentence generation, conditional sequence-to-sequence caption generator (CSCG) is described.

<<CSCG>>

As with the SCG, the CSCG is an encoder-decoder model that uses the RLM as decoder. However, the CSCG controls the specificity of the sentence to be generated by conditioning the decoder (see FIG. 4). The conditioning is made by giving a condition concerning the specificity of the sentence (specificitical condition) as an input to the decoder. Here, a condition concerning the specificity of the sentence is designation of a condition concerning the specificity of the sentence to be generated.

Referring to FIG. 4, the CSCG is described. The CSCG generates a sentence corresponding to an input sound signal from the sound signal and from a condition concerning the specificity of the sentence through the following steps and outputs it.

(1) The CSCG extracts the latent variable z, which is a distributed representation of sound, from the sound signal via the encoder.

(2) The CSCG generates a sentence by sequentially outputting the word at time t (t=1, 2, . . . ) from the latent variable z and a condition C on the specificity of the sentence via the decoder. The generated sentence will be a sentence that has specificity close to the condition C concerning the specificity of the sentence. FIG. 4 shows that the specificity $I_s$ of the generated sentence s="Birds are singing" is close to the condition C concerning the specificity of the sentence.

The CSCG can be learned through supervised learning using learning data that are pairs of sound signals and sentences corresponding to those sound signals (hereinafter referred to as first learning data) (hereinafter referred to as first learning). The CSCG can also be learned through the first learning using the first learning data and supervised learning using learning data that are pairs of specificities of sentences and sentences corresponding to the specificities (hereinafter referred to as second learning data) (hereinafter referred to as second learning). In this case, the CSCG is learned by alternately executing the first learning and the second learning each for one epoch, for example. The CSCG is also learned by executing the first learning and the second learning such that the two types of learning are mixed in a certain manner, for example. In doing so, the number of times the first learning is executed and the number of times the second learning is executed may be different values.

(1) The First Learning

Sentences corresponding to sound signals (that is, sentences as elements of teaching data) for use are manually provided ones. In the first learning, the specificity of a sentence corresponding to a sound signal is determined and included into the teaching data. The first learning performs learning so as to achieve minimization of $L_{SCG}$, which is an error between a generated sentence and a sentence as teaching data, and minimization of $L_{sp}$, which is an error related to specificity, at the same time. An error function $L_{CSCG}$ can be one that is defined with the two errors, $L_{SCG}$ and $L_{sp}$. For example, the error function $L_{CSCG}$ can be a linear sum of the two errors like the following formula:

$$L_{CSCG} = L_{SCG} + \lambda L_{sp}$$

Here, $\lambda$ is a predetermined constant.

Specific definition of the error $L_{sp}$ is discussed later.

(2) The Second Learning

When the number of the first learning data is low, learning the CSCG only with the first learning can make the CSCG excessively adapted to sound signals that are elements of the first learning data and specificity can less likely be reflected appropriately. Thus, in addition to the first learning with the first learning data, the decoder constituting the CSCG is learned through the second learning with the second learning data.

In the second learning, the decoder being learned is used to generate a sentence corresponding to a specificity c which is an element of the second learning data, and the decoder is learned so as to minimize the error $L_{sp}$ using a sentence that is an element of the second learning data as teaching data for the generated sentence. The specificity c as an element of the second learning data may be one generated in a predetermined manner such as by random number generation. A sentence as an element of the second learning data is a sentence having specificity close to the specificity c (that is, with a difference from the specificity c being smaller than a predetermined threshold or equal to or smaller than a predetermined threshold).

Specifically, normalization is applied using $L_{SCG}$, which is an error between a generated sentence and a sentence having specificity close to c.

$$L_{CSCG} = \lambda' L_{SCG} + \lambda L_{sp}$$

Here, $\lambda'$ is a constant satisfying $\lambda' < 1$.

By executing the second learning in addition to the first learning, generalization performance of the CSCG can be improved.

The error $L_{sp}$ can also be defined as the difference between the specificity of a generated sentence and the specificity of the sentence as teaching data in the case of the first learning, and as the difference between the specificity of a generated sentence and the specificity given as teaching data in the case of the second learning. However, when the error $L_{sp}$ is defined in this manner, an error cannot be back-propagated because discretization into one word is performed at a point when the output at time t is obtained. Accordingly, in order to enable learning by error backpropagation, it is effective to use an estimated value of the specificity of a generated sentence instead of the specificity. For example, an estimated specificity $\hat{I}_s$ of a generated sentence s can be one defined by the following formulas:

$$\hat{I}_s = \sum_t E(I_{w_{t,j}})$$

$$E(I_{w_{t,j}}) = \sum_j I_{w_{t,j}} p(w_{t,j}).$$

Here, the value $p(w_{t,j})$ of unit j of the output layer of the decoder at time t is the probability of generation of word $w_{t,j}$ corresponding to the unit j, and $I_{w\_t,j}$ is the information content of the word $w_{t,j}$, which is determined based on the probability of generation $p_{w\_t,j}$ of the word $w_{t,j}$.

Then, the error $L_{sp}$ is defined as the difference between the estimated specificity $\hat{I}_s$ and the specificity of the sentence as teaching data in the case of the first learning, and as the difference between the estimated specificity $\hat{I}_s$ and the specificity given as the teaching data in the case of the second learning.

<<Experiment>>

In this section, results of an experiment for verifying the effect of sentence generation with the CSCG are explained. The experiment was conducted for the two purposes:
(1) Verifying controllability with specificity; and
(2) Evaluating the quality of generated sentences by subjective evaluation concerning acceptability.

First, data used in the experiment is described. From sound signals (within 6 seconds) that were acquired by recording sound events such as musical instrument sound and voice, 392 sound sources with descriptive sentences (supervised learning data) and 579 sound sources without descriptive sentences (unsupervised learning data) were generated. In generating the sound sources with descriptive sentences, one to four descriptive sentences were given to each sound source. The total number of descriptive sentences given is 1113. These descriptive sentences were generated by asking subjects to listen to each sound source and write a sentence describing what kind of sound it is. Further, by making partial deletion and replacement to the 1113 descriptive sentences, they were increased to 21726 descriptive sentences and the 21726 descriptive sentences were used to build a descriptive sentence database.

The experiment results are now explained. The experiment results were evaluated in the form of comparison between the SCG and the CSCG. In the experiment, sentences were generated using a learned SCG and a learned CSCG.

Experiment results related to the purpose (1) are described first. FIG. 5 is a table showing what kinds of sentences were generated by the SCG and the CSCG for certain sound sources. For example, it shows that for a sound source of snapping fingers, the sentence "a light sound is produced only momentarily" (a generated caption) was generated by the SCG and the sentence "fingers are snapped" was generated by the CSCG with a specificity of 20. FIG. 6 is a table showing the means and standard deviations of specificity for the respective models. These statistics were calculated from the results of generating sentences with 29 sound sources as test data. From the table of FIG. 6, the followings can be seen in relation to specificity:
(1) The SCG has a very large standard deviation in specificity.
(2) The CSCG generated sentences having specificity responsive to the value of the input specificity c and has a small standard deviation compared that of the SCG. However, the standard deviation becomes larger as the input specificity c is higher. This is probably because variations become larger due to absence of a descriptive sentence that fits sound while having specificity close to the input specificity c.

It can be seen that the CSCG is able to reduce variations in the specificity of generated sentences and generate sentences appropriate for the specificity.

Experiment results related to the purpose (2) are described next. First, whether sentences generated with the SCG could be subjectively accepted was evaluated on a scale of four levels. Then, sentences generated with the SCG and sentences generated with the CSCG were compared and evaluated.

Figure 7:
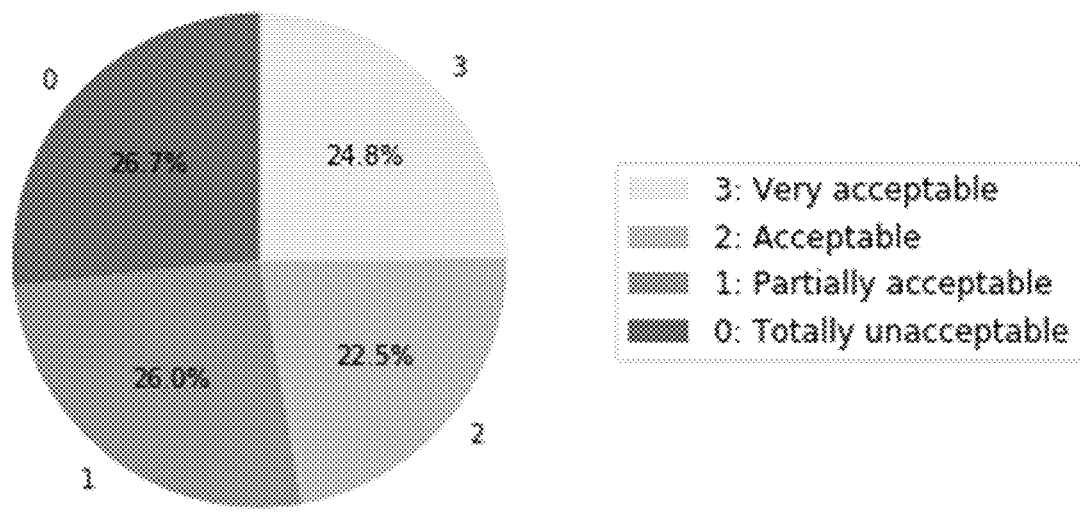
FIG. 7 shows experiment results.

The four-level evaluation used 29 sound sources as test data and adopted a form where 41 subjects answered for all the test data. FIG. 7 shows the results. The mean value was 1.45 and the variance was 1.28. This shows that sentences generated with the SCG acquired evaluations higher than "partially acceptable" on average.

Figure 8:
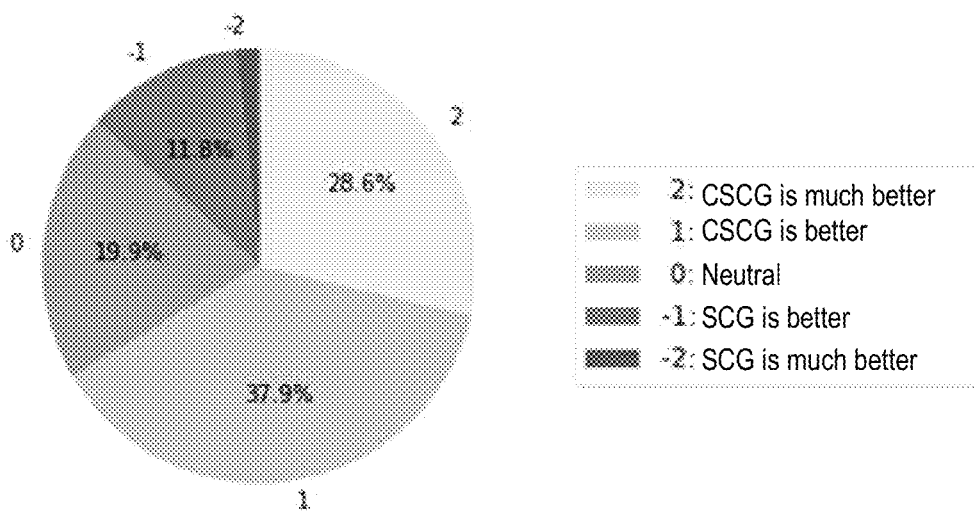
FIG. 8 shows experiment results.

In the comparison and evaluation, sentences generated with the CSCG under the four conditions of c=20, 50, 80, 100 and sentences generated with the SCG were compared and evaluated and answers that gave the highest evaluation to the CSCG among the four levels of comparison and evaluation were selected and aggregated. FIG. 8 shows the result. The result is for the answers of 19 subjects with 100 sound sources as test data, where the CSCG acquired an evaluation significantly higher than that for the SCG with a significance level of 1%. The mean value was 0.80 and the variance was 1.07.

<<Variations of Specificity>>

Specificity is an auxiliary input for controlling the nature (specifically, information content) of a sentence to be generated. The specificity may be a single numerical value (a scalar value) or a set of numerical values (a vector) as long as it can control the nature of a sentence to be generated. The followings are several examples of the same.

(Example 1) an Approach Based on the Frequency of Appearance of a Word N-Gram, which is a Sequence of N Words This approach uses the frequency of appearance of a sequence of words instead of the frequency of appearance of a single word. This approach may be able to control the nature of a sentence to be generated more appropriately because it can take an order of words into consideration. As with the probability of appearance of a word, the probability of appearance of a word N-gram can be calculated using a descriptive sentence database. Instead of a descriptive sentence database, any other available corpus may be used.

(Example 2) an Approach Based on the Number of Words

This approach uses the number of words contained in a sentence as specificity. Instead of the number of words, the number of characters may be used.

(Example 3) an Approach Using a Vector

For example, a three-dimensional vector with a set of the probability of appearance of a word, the probability of appearance of a word N-gram, and the number of words described above may be used as specificity. It is also possible to set categories (topics) for classification of words, such as politics, economics, and science, allocate a dimension to each category, and define specificity with a set of the probability of appearance of words in the respective categories as a vector. This would enable reflection of wordings that are specific to each category.

<<Application>>

The framework of learning of the SCG/CSCG and sentence generation with the SCG/CSCG can also be applied to more complicated sound like music or even media other than sound, aside from relatively simple sounds such as the sound sources illustrated in FIG. 5. Media other than sound can include images such as pictures, illustrations, or clip arts, and moving images. They may also be industrial designs or gustatory sense.

As with the SCG/CSCG, a model for associating such data with sentences corresponding to the data can be learned and the model can be used to generate a sentence. For example, for gustatory sense, it will be possible to generate a sentence as description/review about wine or agricultural produce by using a signal from a gustatory sensor as input.

In that case, signals from an olfactory sensor, a tactile sensor, and a camera may be input together in addition to the gustatory sensor.

For handling of non-time-series data, the encoder and the decoder may be built with neural networks such as a convolutional neural network (CNN), for example.

First Embodiment

<<Data Generation Model Learning Apparatus 100>>

Figure 9:
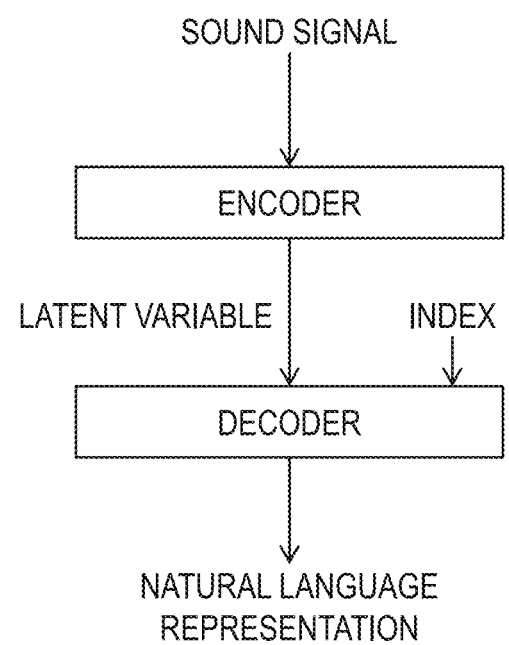
FIG. 9 shows an overview of a data generation model.

A data generation model learning apparatus 100 performs learning of a data generation model using learning data. The learning data includes the first learning data, which is pairs of sound signals and natural language representations corresponding to the sound signals, and the second learning data, which is pairs of indices for natural language representations and natural language representations corresponding to the indices. The data generation model refers to a function that takes as input a sound signal and a condition concerning an index for a natural language representation (for example, the specificity of a sentence) and generates and outputs a natural language representation corresponding to the sound signal. The data generation model is constructed as a pair of an encoder for generating, from a sound signal, a latent variable corresponding to the sound signal and a decoder for generating a natural language representation corresponding to the sound signal from the latent variable and the condition concerning an index for the natural language representation (see FIG. 9). A condition concerning an index for a natural language representation means an index required for the natural language representation to be generated, and the required index may be designated with a single numerical value or with a range. The encoder and the decoder can be any kind of neural networks that can process time-series data. Examples of natural language representations include phrases made up of two or more words without a subject and a predicate and onomatopoeia, aside from sentences as described in <Technical background>.

Figure 10:
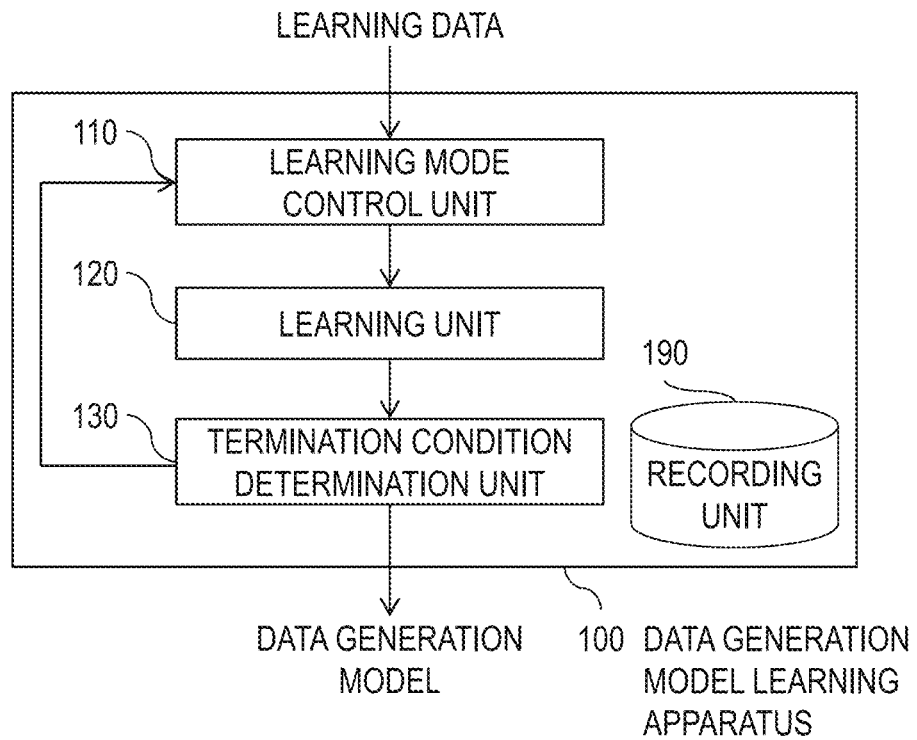
FIG. 10 is a block diagram showing a configuration of a data generation model learning apparatus 100.
Figure 11:
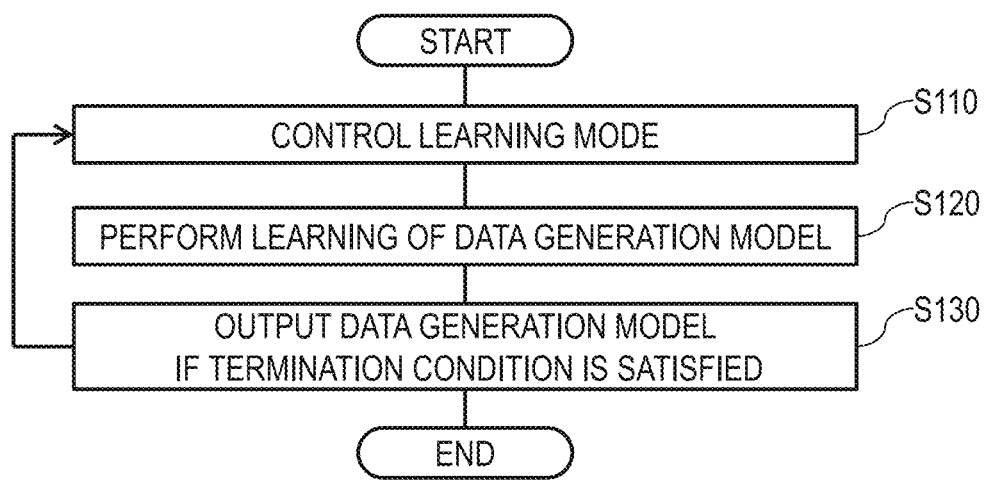
FIG. 11 is a flowchart illustrating operations of the data generation model learning apparatus 100.

Now referring to FIGS. 10 and 11, the data generation model learning apparatus 100 is described. FIG. 10 is a block diagram showing a configuration of the data generation model learning apparatus 100. FIG. 11 is a flowchart illustrating operations of the data generation model learning apparatus 100. As shown in FIG. 10, the data generation model learning apparatus 100 includes a learning mode control unit 110, a learning unit 120, a termination condition determination unit 130, and a recording unit 190. The recording unit 190 is a component that records information necessary for processing by the data generation model learning apparatus 100 as desired. The recording unit 190 records learning data therein before learning is started, for example.

In accordance with FIG. 11, operation of the data generation model learning apparatus 100 is described. The data generation model learning apparatus 100 takes as input the first learning data, an index for a natural language representation as an element of the first learning data, and the second learning data, and outputs a data generation model. An index for a natural language representation as an element of the first learning data may also be determined by the learning unit 120 from a natural language representation as an element of the first learning data, instead of being input.

In S110, the learning mode control unit 110 takes as input the first learning data, an index for a natural language representation as an element of the first learning data, and the second learning data, and generates and outputs a control signal for controlling the learning unit 120. Here, the control signal is a signal to control learning mode so that either of the first learning and the second learning is executed. The control signal can be a signal to control the learning mode so that the first learning and the second learning are alternately executed, for example. The control signal can also be a signal to control the learning mode so as to execute the first learning and the second learning such that the two types of learning are mixed in a certain manner, for example. In that case, the number of times the first learning is executed and the number of times the second learning is executed may be different values.

In S120, the learning unit 120 takes as input the first learning data, an index for a natural language representation as an element of the first learning data, the second learning data, and the control signal that was output in S110. When the learning designated by the control signal is the first learning, the learning unit 120 uses the first learning data and the index for a natural language representation as an element of the first learning data to perform learning of an encoder for generating a latent variable corresponding to a sound signal from the sound signal and a decoder for generating a natural language representation corresponding to the sound signal from the latent variable and a condition concerning an index for a natural language representation. When the learning designated by the control signal is the second learning, the learning unit 120 uses the second learning data to perform learning of the decoder. And the learning unit 120 outputs a data generation model which is a pair of the encoder and the decoder, with information necessary for the termination condition determination unit 130 to make a determination on a termination condition (for example, the number of times learning has been performed). The learning unit 120 executes learning in units of epoch regardless of whether the learning being executed is the first learning or the second learning. The learning unit 120 also performs learning of the data generation model by error backpropagation with the error function $L_{CSCG}$. The error function $L_{CSCG}$ is defined by the formula below when the learning to be executed is the first learning, where $\lambda$ is a predetermined constant.

$$L_{CSCG} = L_{SCG} + \lambda L_{sp}$$

When the learning to be executed is the second learning, it is defined by the formula below, where $\lambda'$ is a constant that satisfies $\lambda' < 1$.

$$L_{CSCG} = \lambda' L_{SCG} + \lambda L_{sp}$$

Here, the error $L_{SCG}$ related to a natural language representation is, when the learning to be executed is the first learning, a cross-entropy calculated from a natural language representation which is the output of the data generation model for a sound signal as an element of the first learning data and a natural language representation as an element of the first learning data, and is, when the learning to be executed is the second learning, a cross-entropy calculated from a natural language representation which is the output of the decoder for the index as an element of the second learning data and a natural language representation as an element of the second learning data.

The error function $L_{CSCG}$ may be any function that is defined with the two errors, $L_{SCG}$ and $L_{sp}$.

When a natural language representation is a sentence, the specificity of the sentence can be used as an index for a natural language representation as discussed in <Technical background>. In this case, the specificity of the sentence is defined with at least one of the probability of appearance of a word or the probability of appearance of a word N-gram that is contained in the sentence defined using at least a predetermined word database, the number of words contained in the sentence, and the number of characters contained in the sentence. For example, the specificity of a sentence may be defined by the formula below, where $I_s$ is the specificity of a sentence s which is a sequence of n words $[w_1, w_2, \ldots, w_n]$.

$$I_s = \sum_{t=1}^{n} I_{w_t}$$

(Here, $I_{w\_t}$ is the information content of the word $w_t$, which is determined based on the probability of appearance $p_{w\_t}$ of the word $w_t$.)

The specificity $I_s$ may be anything that is defined with the information content $I_{w\_t}$ (1≤t≤n).

The word database can be any kind of database that allows definition of the probability of appearance of a word contained in sentences or the probability of appearance of a word N-gram contained in sentences. The word database can be the descriptive sentence database described in <Technical background>, for example.

The estimated specificity $\hat{I}_s$ of the sentence s as the output of the decoder is defined as:

$$\hat{I}_s = \sum_{t} E(I_{w_{t,j}})$$

$$E(I_{w_{t,j}}) = \sum_{j} I_{w_{t,j}} p(w_{t,j})$$

(where, the value $p(w_{t,j})$ of the unit j of the output layer of the decoder at time t is the probability of generation of the word $w_{t,j}$ corresponding to the unit j, and $I_{w\_t,j}$ is the information content of the word $w_{t,j}$, which is determined based on the probability of generation $p_{w\_t,j}$ of the word $w_{t,j}$), and the error $L_{sp}$ related to the specificity of the sentence is, when the learning to be executed is the first learning, the difference between the estimated specificity $\Delta I_s$ and the specificity of a sentence as an element of the first learning data, and is, when the learning to be executed is the second learning, the difference between the estimated specificity $\hat{I}_s$ and specificity as an element of the second learning data.

For a phrase, specificity can also be defined as with a sentence.

In S130, the termination condition determination unit 130 takes as input the data generation model that was output at S120 and information necessary for determining the termination condition that was output at S120 and determines whether the termination condition, which is a condition concerning termination of learning, is satisfied or not (for example, the number of times learning has been performed has reached a predetermined number of iterations). If the termination condition is satisfied, the termination condition determination unit 130 outputs the data generation model and ends the processing. On the other hand, if the termination condition is not satisfied, it returns to the processing of S110.

<<Data Generation Model Learning Apparatus 150>>

A data generation model learning apparatus 150 performs learning of a data generation model using learning data. The data generation model learning apparatus 150 is different from the data generation model learning apparatus 100 in that it executes only the first learning using the first learning data.

Figure 12:
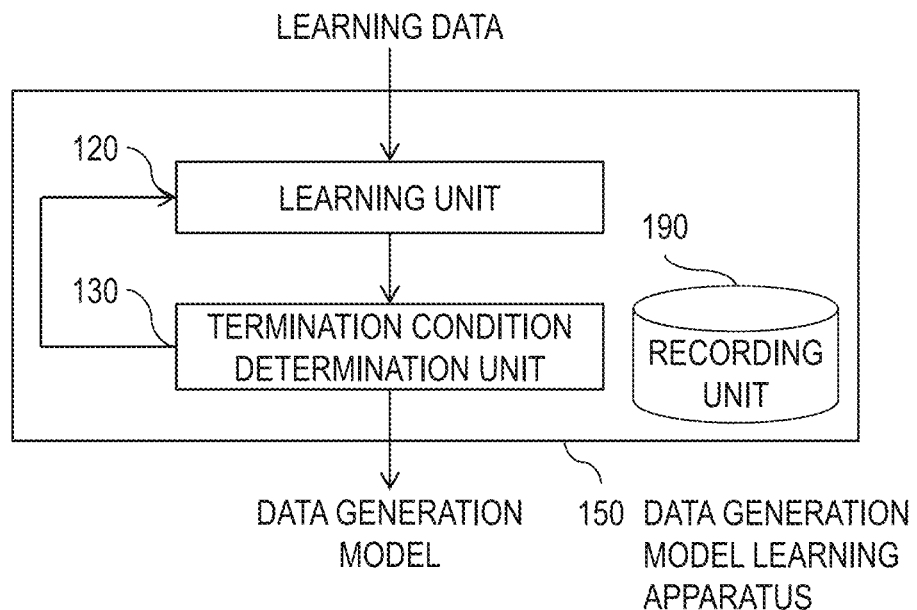
FIG. 12 is a block diagram showing a configuration of a data generation model learning apparatus 150.
Figure 13:
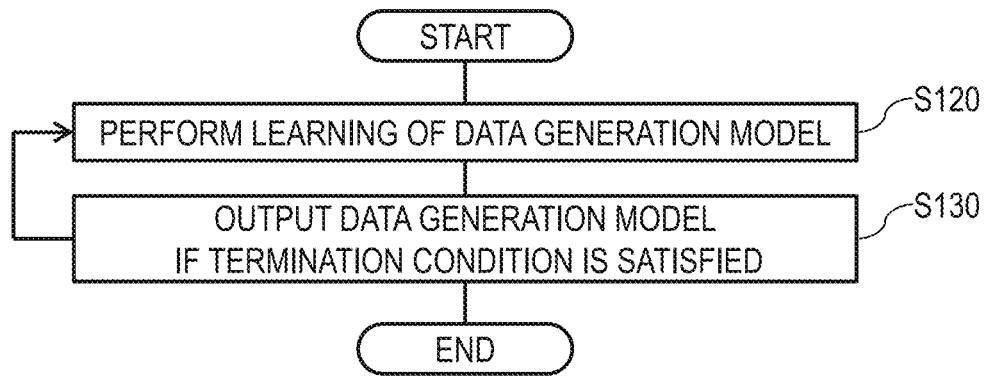
FIG. 13 is a flowchart illustrating operations of the data generation model learning apparatus 150.

Now referring to FIGS. 12 and 13, the data generation model learning apparatus 150 is described. FIG. 12 is a block diagram showing a configuration of the data generation model learning apparatus 150. FIG. 13 is a flowchart illustrating operations of the data generation model learning apparatus 150. As shown in FIG. 12, the data generation model learning apparatus 150 includes the learning unit 120, the termination condition determination unit 130, and the recording unit 190. The recording unit 190 is a component that records information necessary for processing by the data generation model learning apparatus 150 as desired.

In accordance with FIG. 13, operation of the data generation model learning apparatus 150 is described. The data generation model learning apparatus 150 takes as input the first learning data and an index for a natural language representation as an element of the first learning data, and outputs a data generation model. An index for a natural language representation as an element of the first learning data may also be determined by the learning unit 120 from a natural language representation as an element of the first learning data, instead of being input.

In S120, the learning unit 120 takes as input the first learning data and an index for a natural language representation as an element of the first learning data, performs learning of the encoder and the decoder using the first learning data and the index for a natural language representation as an element of the first learning data, and outputs the data generation model which is a pair of the encoder and the decoder, with information necessary for the termination condition determination unit 130 to make a determination on the termination condition (for example, the number of times learning has been performed). The learning unit 120 executes learning in units of epoch, for example. The learning unit 120 also performs learning of the data generation model by error backpropagation with the error function $L_{CSCG}$. The error function $L_{SCG}$ is defined by the formula below, where λ is a predetermined constant.

$$L_{CSCG} = L_{SCG} + \lambda L_{sp}$$

The definition of the two errors $L_{SCG}$ and $L_{sp}$ is the same as that for the data generation model learning apparatus 100. The error function $L_{CSCG}$ may be any function that is defined with the two errors, $L_{SCG}$ and $L_{sp}$.

In S130, the termination condition determination unit 130 takes as input the data generation model that was output at S120 and information necessary for determining the termination condition that was output at S120 and determines whether the termination condition, which is a condition concerning termination of learning, is satisfied or not (for example, the number of times learning has been performed has reached a predetermined number of iterations). If the termination condition is satisfied, the termination condition determination unit 130 outputs the data generation model and ends the processing. On the other hand, if the termination condition is not satisfied, it returns to the processing of S120.

<<Data Generation Apparatus 200>>

A data generation apparatus 200 generates a natural language representation corresponding to a sound signal from the sound signal and a condition concerning an index for a natural language representation, using a data generation model learned with the data generation model learning apparatus 100 or the data generation model learning apparatus 150. A data generation model learned with the data generation model learning apparatus 100 or the data generation model learning apparatus 150 is also referred to as a learned data generation model. The encoder and the decoder constituting a learned data generation model are also referred to as a learned encoder and a learned decoder, respectively. It is of course possible to use a data generation model learned with a data generation model learning apparatus other than the data generation model learning apparatus 100 or the data generation model learning apparatus 150.

Figure 14:
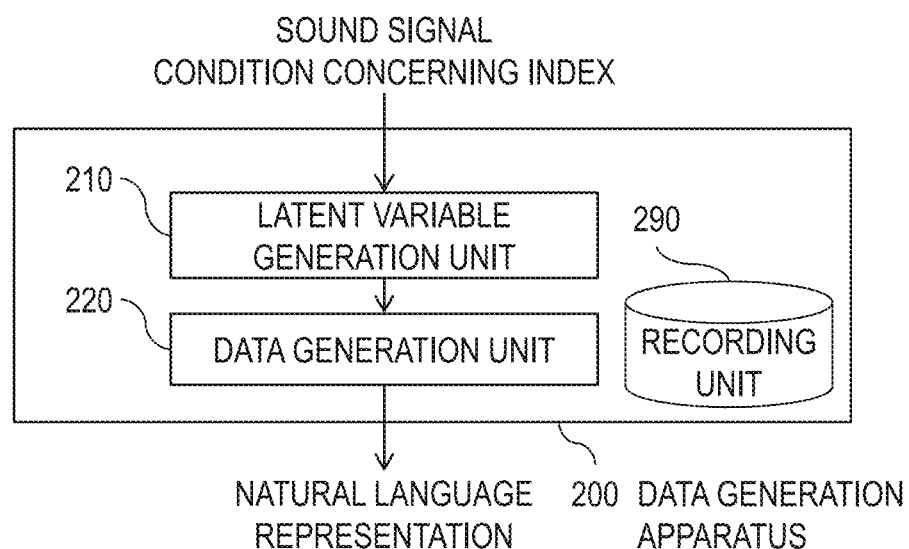
FIG. 14 is a block diagram showing a configuration of a data generation apparatus 200.
Figure 15:
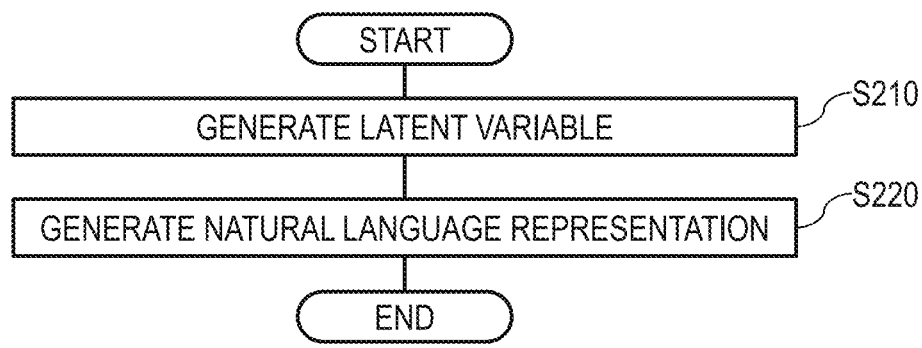
FIG. 15 is a flowchart illustrating operations of the data generation apparatus 200.

Now referring to FIGS. 14 and 15, the data generation apparatus 200 is described. FIG. 14 is a block diagram showing a configuration of the data generation apparatus 200. FIG. 15 is a flowchart illustrating operations of the data generation apparatus 200. As shown in FIG. 14, the data generation apparatus 200 includes a latent variable generation unit 210, a data generation unit 220, and a recording unit 290. The recording unit 290 is a component that records information necessary for processing by the data generation apparatus 200 as desired. The recording unit 290 records a learned data generation model (that is, a learned encoder and a learned decoder) therein beforehand, for example.

In accordance with FIG. 15, operation of the data generation apparatus 200 is described. The data generation apparatus 200 takes as input a sound signal and a condition concerning an index for a natural language representation, and outputs a natural language representation.

In S210, the latent variable generation unit 210 takes a sound signal as input, generates a latent variable corresponding to the sound signal from the sound signal using the learned encoder, and outputs it.

In S220, the data generation unit 220 takes as input the latent variable that was output in S210 and the condition concerning an index for a natural language representation, generates a natural language representation corresponding to the sound signal from the latent variable and the condition concerning an index for a natural language representation using the learned decoder, and outputs it.

This embodiment of the present invention enables learning of a data generation model for generating a natural language representation corresponding to a sound signal from the sound signal, using an index for a natural language representation as auxiliary input. This embodiment of the present invention also enables generation of a natural language representation corresponding to a sound signal from the sound signal while controlling an index for the natural language representation.

Second Embodiment

In the following description, a domain is intended to mean a set of data of a certain type. Examples of domains include a sound signal domain, which is a set of sound signals as used in the first embodiment, and a natural language representation domain, which is a set of natural language representations as used in the first embodiment, for example. An example of data of domains is various kinds of signals that can be acquired with a gustatory sensor, an olfactory sensor, a tactile sensor, a camera, and the like as described in <Technical background>. These signals are signals related to the five senses of the human being and will be referred to as signals based on sensory information, including sound signals.

<<Data Generation Model Learning Apparatus 300>>

A data generation model learning apparatus 300 performs learning of a data generation model using learning data. The learning data includes the first learning data, which is pairs of data of a first domain and data of a second domain corresponding to the data of the first domain, and the second learning data, which is pairs of indices for the data of the second domain and data of the second domain corresponding to the indices. The data generation model refers to a function that takes as input data of the first domain and a condition concerning an index for data of the second domain and generates and outputs data of the second domain corresponding to the data of the first domain. The data generation model is constructed as a pair of an encoder for generating a latent variable corresponding to the data of the first domain from the data of the first domain and a decoder for generating data of the second domain corresponding to the data of the first domain from the latent variable and the condition concerning an index for the data of the second domain. The condition concerning an index for the data of the second domain means an index required for the data of the second domain to be generated, and the required index may be designated with a single numerical value or with a range. The encoder and the decoder can be any kind of neural networks that can process data of the first domain and data of the second domain.

Figure 16:
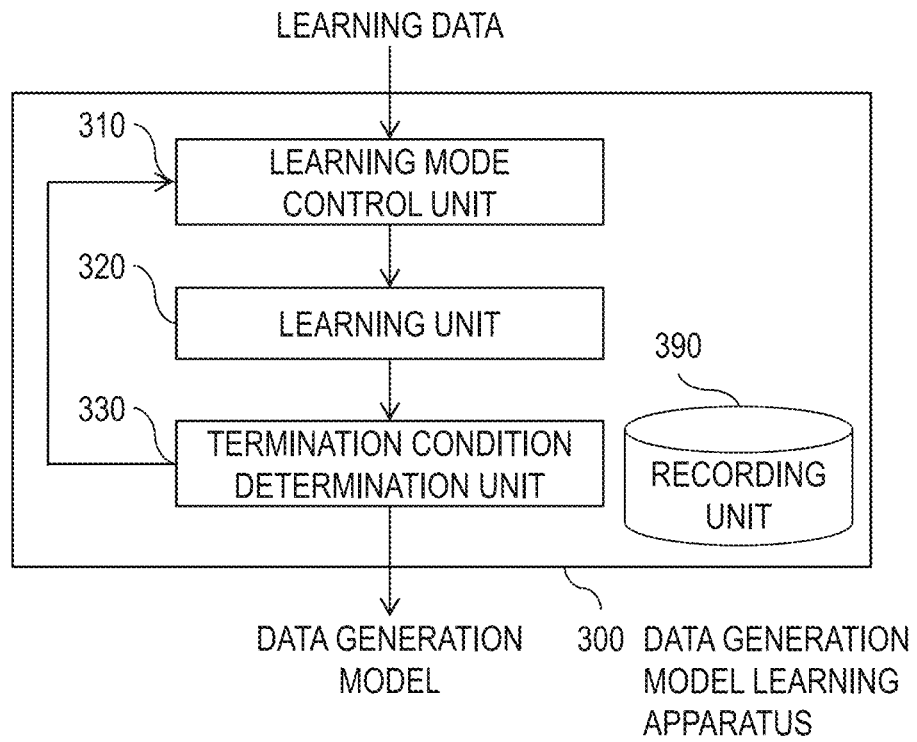
FIG. 16 is a block diagram showing a configuration of a data generation model learning apparatus 300.
Figure 17:
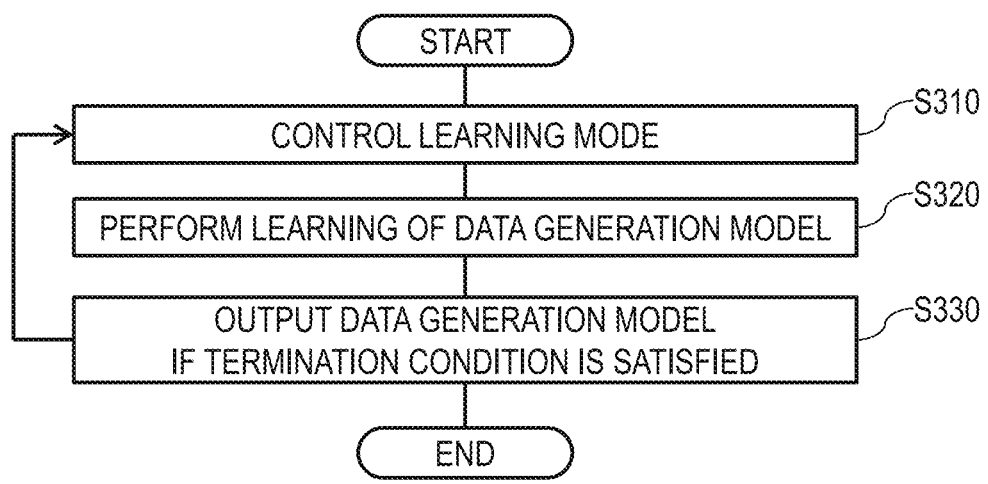
FIG. 17 is a flowchart illustrating operations of the data generation model learning apparatus 300.

Now referring to FIGS. 16 and 17, the data generation model learning apparatus 300 is described. FIG. 16 is a block diagram showing a configuration of the data generation model learning apparatus 300. FIG. 17 is a flowchart illustrating operations of the data generation model learning apparatus 300. As shown in FIG. 16, the data generation model learning apparatus 300 includes a learning mode control unit 310, a learning unit 320, a termination condition determination unit 330, and a recording unit 390. The recording unit 390 is a component that records information necessary for processing by the data generation model learning apparatus 300 as desired. The recording unit 390 records learning data therein before learning is started, for example.

In accordance with FIG. 17, operation of the data generation model learning apparatus 300 is described. The data generation model learning apparatus 300 takes as input the first learning data, an index for the data of the second domain as an element of the first learning data, and the second learning data, and outputs a data generation model. The index for the data of the second domain as an element of the first learning data may also be determined by the learning unit 320 from the data of the second domain as an element of the first learning data, instead of being input.

In S310, the learning mode control unit 310 takes as input the first learning data, an index for the data of the second domain as an element of the first learning data, and the second learning data, and generates and outputs a control signal for controlling the learning unit 320. Here, the control signal is a signal to control learning mode so that either of the first learning and the second learning is executed. The control signal can be a signal to control the learning mode so that the first learning and the second learning are alternately executed, for example. The control signal can also be a signal to control the learning mode so as to execute the first learning and the second learning such that the two types of learning are mixed in a certain manner, for example. In that case, the number of times the first learning is executed and the number of times the second learning is executed may be different values.

In S320, the learning unit 320 takes as input the first learning data, the index for the data of the second domain as an element of the first learning data, the second learning data, and the control signal that was output in S310. When the learning designated by the control signal is the first learning, the learning unit 320 uses the first learning data and the index for the data of the second domain as an element of the first learning data to perform learning of an encoder for generating a latent variable corresponding to the data of the first domain from the data of the first domain and a decoder for generating data of the second domain corresponding to the data of the first domain from the latent variable and the condition concerning an index for the data of the second domain. When the learning designated by the control signal is the second learning, the learning unit 320 uses the second learning data to perform learning of the decoder. And the learning unit 320 outputs a data generation model which is a pair of the encoder and the decoder, with information necessary for the termination condition determination unit 330 to make a determination on the termination condition (for example, the number of times learning has been performed). The learning unit 320 executes learning in units of epoch regardless of whether the learning being executed is the first learning or the second learning. The learning unit 320 also performs learning of the data generation model by error backpropagation with the predetermined error function L. The error function L is defined by the formula below when the learning to be executed is the first learning, where λ is a predetermined constant.

$$L=L_1+\lambda L_2$$

When the learning to be executed is the second learning, it is defined by the formula below, where λ' is a constant that satisfies λ'<1.

$$L=\lambda'L_1+\lambda L_2$$

Here, the error $L_1$ related to the data of the second domain is, when the learning to be executed is the first learning, a cross-entropy calculated from data of the second domain which is the output of the data generation model for the data of the first domain as an element of the first learning data and data of the second domain as an element of the first learning data, and is, when the learning to be executed is the second learning, a cross-entropy calculated from data of the second domain which is the output of the decoder for the index as an element of the second learning data and data of the second domain as an element of the second learning data.

The error function L may be any function that is defined with the two errors, $L_1$ and $L_2$.

Data of the second domain as an element of the second learning data are those data of the second domain that have an index close to an index as an element of the second learning data (that is, with a difference from the index being smaller than a predetermined threshold or equal to or smaller than a predetermined threshold).

An estimated index $\hat{I}_s$ of data s of the second domain as the output of the decoder is defined as:

$$\hat{I}_s = \sum_t E(I_{w_{t,j}})$$

$$E(I_{w_{t,j}}) = \sum_j I_{w_{t,j}} p(w_{t,j})$$

(where the value $p(w_{t,j})$ of the unit j of the output layer of the decoder at time t is the probability of generation of data $w_{t,j}$ of the second domain corresponding to the unit j, and $I_{w_{t,j}}$ is the information content of the data $w_{t,j}$ of the second domain, which is determined based on the probability of generation $p_{w_{t,j}}$ of the data $w_{t,j}$ of the second domain), and the error $L_2$ related to the index for the data of the second domain is, when the learning to be executed is the first learning, the difference between the estimated index $\hat{I}_s$ and the index for the data of the second domain as an element of the first learning data, and is, when the learning to be executed is the second learning, the difference between the estimated index $\hat{I}_s$ and the index as an element of the second learning data.

In S330, the termination condition determination unit 330 takes as input the data generation model that was output at S320 and information necessary for determining the termination condition that was output at S320 and determines whether the termination condition, which is a condition concerning termination of learning, is satisfied or not (for example, the number of times learning has been performed has reached a predetermined number of iterations). If the termination condition is satisfied, the termination condition determination unit 330 outputs the data generation model and ends the processing. On the other hand, if the termination condition is not satisfied, it returns to the processing of S310.

<<Data Generation Model Learning Apparatus 350>>

A data generation model learning apparatus 350 performs learning of a data generation model using learning data. The data generation model learning apparatus 350 is different from the data generation model learning apparatus 300 in that it executes only the first learning using the first learning data.

Figure 18:
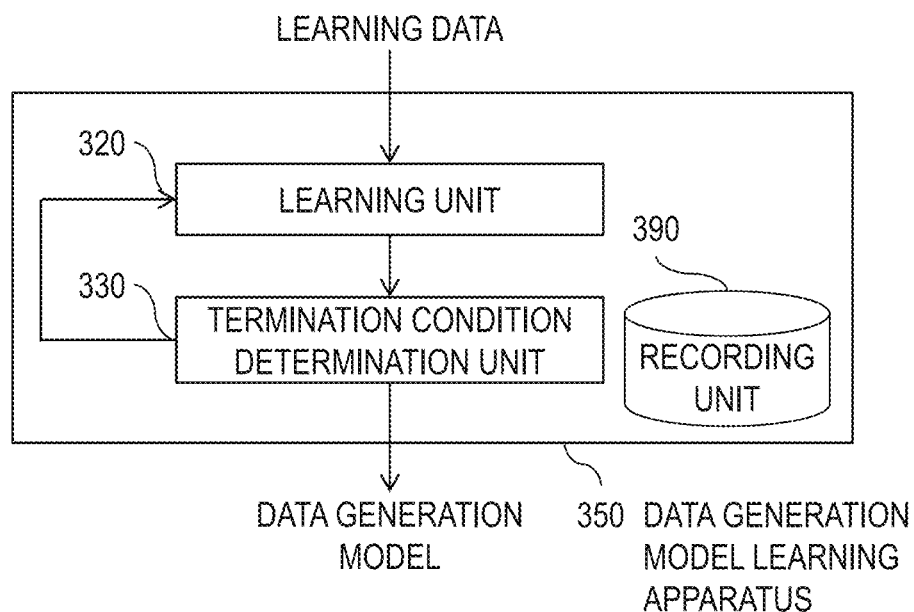
FIG. 18 is a block diagram showing a configuration of a data generation model learning apparatus 350.
Figure 19:
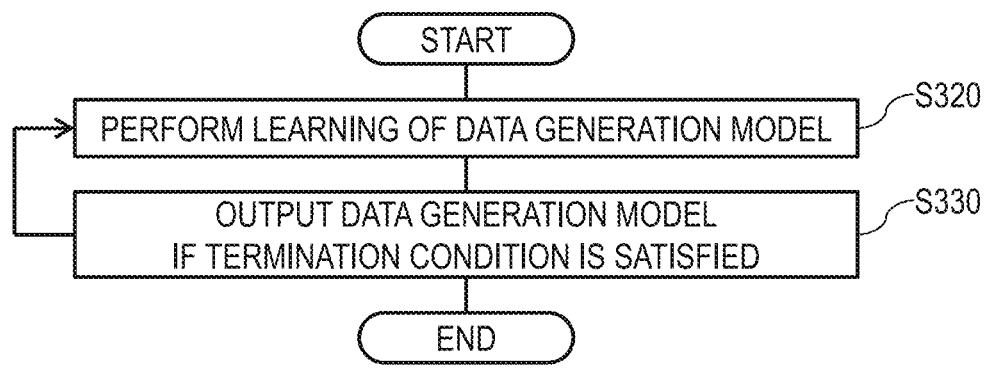
FIG. 19 is a flowchart illustrating operations of the data generation model learning apparatus 350.

Now referring to FIGS. 18 and 19, the data generation model learning apparatus 350 is described. FIG. 18 is a block diagram showing a configuration of the data generation model learning apparatus 350. FIG. 19 is a flowchart illustrating operations of the data generation model learning apparatus 350. As shown in FIG. 18, the data generation model learning apparatus 350 includes the learning unit 320, the termination condition determination unit 330, and the recording unit 390. The recording unit 390 is a component that records information necessary for processing by the data generation model learning apparatus 350 as desired.

In accordance with FIG. 19, operation of the data generation model learning apparatus 350 is described. The data generation model learning apparatus 350 takes as input the first learning data and an index for the data of the second domain as an element of the first learning data, and outputs a data generation model. An index for the data of the second domain as an element of the first learning data may also be determined by the learning unit 320 from the data of the second domain as an element of the first learning data, instead of being input.

In S320, the learning unit 320 takes as input the first learning data and an index for the data of the second domain as an element of the first learning data, performs learning of the encoder and the decoder using the first learning data and the index for the data of the second domain as an element of the first learning data, and outputs the data generation model which is a pair of the encoder and the decoder, with information necessary for the termination condition determination unit 330 to make a determination on the termination condition (for example, the number of times learning has been performed). The learning unit 320 executes learning in units of epoch, for example. The learning unit 320 also performs learning of the data generation model by error backpropagation with the error function L. The error function L is defined by the formula below, where λ is a predetermined constant.

$$L=L_1+\lambda L_2$$

The definition of the two errors $L_1$ and $L_2$ is the same as that for the data generation model learning apparatus 300. The error function L may be any function that is defined with the two errors, $L_1$ and $L_2$.

In S330, the termination condition determination unit 330 takes as input the data generation model that was output at S320 and information necessary for determining the termination condition that was output at S320 and determines whether the termination condition, which is a condition concerning termination of learning, is satisfied or not (for example, the number of times learning has been performed has reached a predetermined number of iterations). If the termination condition is satisfied, the termination condition determination unit 330 outputs the data generation model and ends the processing. On the other hand, if the termination condition is not satisfied, it returns to the processing of S320.

<<Data Generation Apparatus 400>>

A data generation apparatus 400 generates data of the second domain corresponding to the data of the first domain from data of the first domain and a condition concerning an index for the data of the second domain, using a data generation model learned with the data generation model learning apparatus 300 or the data generation model learning apparatus 350. A data generation model learned with the data generation model learning apparatus 300 or the data generation model learning apparatus 350 is also referred to as a learned data generation model. The encoder and the decoder constituting a learned data generation model are also referred to as a learned encoder and a learned decoder, respectively. It is of course possible to use a data generation model learned with a data generation model learning apparatus other than the data generation model learning apparatus 300 or the data generation model learning apparatus 350.

Figure 20:
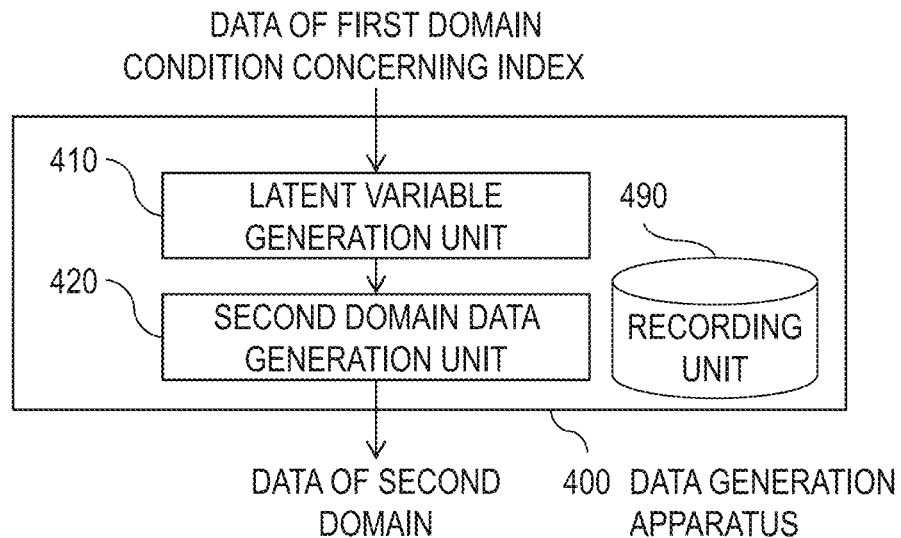
FIG. 20 is a block diagram showing a configuration of a data generation apparatus 400.
Figure 21:
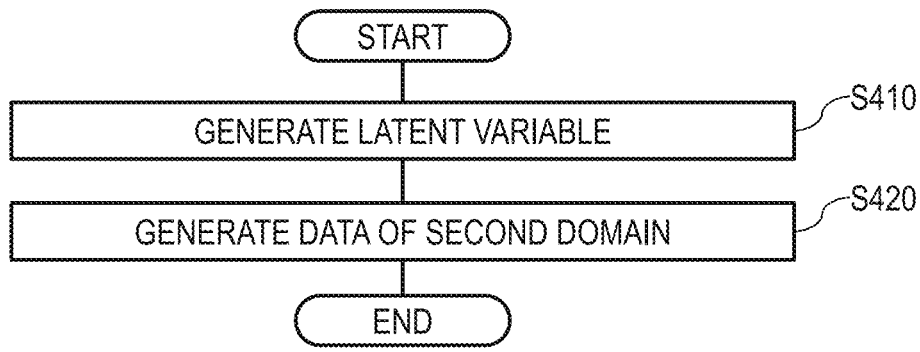
FIG. 21 is a flowchart illustrating operations of the data generation apparatus 400.

Now referring to FIGS. 20 and 21, the data generation apparatus 400 is described. FIG. 20 is a block diagram showing a configuration of the data generation apparatus 400. FIG. 21 is a flowchart illustrating operations of the data generation apparatus 400. As shown in FIG. 20, the data generation apparatus 400 includes a latent variable generation unit 410, a second domain data generation unit 420, and a recording unit 490. The recording unit 490 is a component that records information necessary for processing by the data generation apparatus 400 as desired. The recording unit 490 records a learned data generation model (that is, a learned encoder and a learned decoder) therein beforehand, for example.

In accordance with FIG. 21, operation of the data generation apparatus 400 is described. The data generation apparatus 400 takes as input data of the first domain and a condition concerning an index for the data of the second domain and outputs data of the second domain.

In S410, the latent variable generation unit 410 takes data of the first domain as input, generates a latent variable corresponding to the data of the first domain from the data of the first domain using the learned encoder, and outputs it.

In S420, the second domain data generation unit 420 takes as input the latent variable that was output in S410 and a condition concerning an index for the data of the second domain, generates data of the second domain corresponding to the data of the first domain from the latent variable and the condition concerning an index for the data of the second domain using the learned decoder, and outputs it.

(Specific Examples)

Specific examples are now shown, where the data of the first domain is signals based on sensory information and the data of the second domain is sentences or phrases.

(1) Gustatory Sense

In this case, a descriptive sentence on a production area associated with taste, for example, can be obtained from a signal provided by a gustatory sensor. A descriptive sentence on a production area associated with taste can be a descriptive sentence like "2015 Koshu wine," for example.

(2) Olfactory Sense

In this case, a descriptive sentence on smell can be obtained from a signal provided by an olfactory sensor.

(3) Tactile Sense

In this case, a descriptive sentence on hardness or texture, for example, can be obtained from a signal provided by a tactile sensor or a hardness sensor.

(4) Visual Sense

In this case, a caption for a moving image or a descriptive sentence on a subject in an image, for example, can be obtained from a signal provided by an image sensor such as a camera.

This embodiment of the present invention enables learning of a data generation model for generating data of the second domain corresponding to data of the first domain from the data of the first domain, using an index for data of the second domain as auxiliary input. This embodiment of the present invention also enables generation of data of the second domain corresponding to data of the first domain from the data of the first domain while controlling a predetermined index.

<Appendix>

The apparatus according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the apparatus executing the processing or any necessity.

As already mentioned, when the processing functions of the hardware entities described in the embodiments (the apparatus of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiments of the invention has been presented for the purpose of illustration and description. It is not intended to be exhaustive or to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A data generation model learning apparatus comprising:
   a learning circuitry configured to perform learning a data generation model using first learning data,
      wherein the first learning data comprises a sound signal, a natural language representation of the sound signal, and an index for the natural language representation,
      the learning the data generation model further comprises updating one or more parameter values of one or more layers in a neural network,
      the neural network processes the sound signal in time-series form as input and outputs the natural language representation in textual form,
      the data generation model comprises an encoder and a decoder,
      the encoder generates a latent variable of a sound signal from the sound signal,
      the decoder generates a natural language representation of the sound signal from the latent variable and a condition concerning an index for the natural language representation,
      the latent variable represents a feature of sound corresponding to the sound signal in multi-dimensional vector form, and
      the learning the data generation model further comprises outputting an updated neural network model.

2. The data generation model learning apparatus according claim 1, wherein
   the learning circuitry further performs learning the decoder using second learning data,
      wherein the second learning data comprises an index for a natural language representation and a natural language representation of the index.

3. The data generation model learning apparatus according to claim 2, wherein
   the learning circuitry executes the learning the data generation model and the learning the decoder such that the learning the data generation model and the learning the decoder are mixed in a certain manner.

4. The data generation model learning apparatus according to claim 2, wherein
   the index for the natural language representation is specificity of a sentence,
   an error $L_{SCG}$ related to a sentence is, when learning to be executed is the learning the data generation model, a cross-entropy calculated from a sentence which is an output of the data generation model for a sound signal as an element of the first learning data and a sentence as an element of the first learning data, and is, when learning to be executed is the learning the decoder, a cross-entropy calculated from a sentence which is an output of the decoder for specificity as an element of the second learning data and a sentence as an element of the second learning data, an estimated specificity $\hat{I}_s$ of a sentence s which is an output of the data generation model or the decoder is defined as:

$$\hat{I}_s = \sum_t E(I_{w_{t,j}})$$

$$E(I_{w_{t,j}}) = \sum_j I_{w_{t,j}} p(w_{t,j})$$

(where a value $p(w_{t,j})$ of a unit j of an output layer of the data generation model or the decoder at time t is probability of generation of a word $w_{t,j}$ corresponding to the unit j, and $I_{w\_t,j}$ is an information content of the word $w_{t,j}$ which is determined based on a probability of generation $p_{w\_t,j}$ of the word $w_{t,j}$), an error $L_{sp}$ related to the specificity of a sentence is, when learning to be executed is the learning the data generation model, a difference between the estimated specificity $\hat{I}_s$ and the specificity of a sentence as an element of the first learning data, and is, when learning to be executed is the learning the decoder, a difference between the estimated specificity $\hat{I}_s$ and the specificity as an element of the second learning data, and an error function $L_{CSCG}$ for use by the learning circuitry is defined with the error $L_{SCG}$ and the error $L_{sp}$.

5. A non-transitory computer-readable storage medium which stores a program for causing a computer to function as the data generation model learning apparatus according to claim 1.

6. A data generation apparatus comprising:
a latent variable generation circuitry configured to generate, from a sound signal, a latent variable of to the sound signal using an encoder, and the latent variable representing a feature of sound corresponding to the sound signal in multi-dimensional vector form; and
a data generation circuitry configured to generate a natural language representation of the sound signal from the latent variable and a condition concerning an index for the natural language representation using a decoder, wherein the latent variable generation circuitry and the data generation circuitry respectively comprise a neural network, and the neural network processes the sound signal in time series form as input and outputs the natural language representation in textual form.

7. The data generation apparatus according to claim 6, wherein
the index for the natural language representation is specificity of a sentence, and
the specificity is defined with at least a probability of appearance of a word that is contained in a sentence defined using a predetermined word database or/and the number of words contained in a sentence.

8. The data generation apparatus according to claim 7, wherein
s is a sentence which is a sequence of n words $[w_1, w_2, \ldots, w_n]$, and $I_{w\_t}$ ($1 \leq t \leq n$) is an information content of a word $w_t$ which is determined based on a probability of appearance $p_{w\_t}$ of the word $w_t$, and
the specificity is defined with the information content $I_{w\_t}$ ($1 \leq t \leq n$).

9. A data generation model learning method comprising:
a learning step in which a data generation model learning apparatus performs learning of a data generation model using first learning data,
wherein the first learning data comprises a sound signal, a natural language representation of the sound signal, and an index for the natural language representation,
the learning of the data generation model further comprises updating one or more parameter values of one or more layers in a neural network,
the neural network processes the sound signal in time-series form as input and outputs the natural language representation in textual form,
the data generation model comprises an encoder and a decoder,
the encoder generates a latent variable of a sound signal from the sound signal,
the decoder generates a natural language representation of the sound signal from the latent variable and a condition concerning an index for the natural language representation,
the latent variable represents a feature of sound corresponding to the sound signal in multi-dimensional vector form, and
the learning of the data generation model further comprises outputting an updated neural network model.

10. A data generation method comprising:
a latent variable generation step in which a data generation apparatus generates a latent variable of a sound signal from the sound signal using an encoder,
wherein the latent variable represents a feature of sound corresponding to the sound signal in multi-dimensional vector form; and
a data generation step in which the data generation apparatus generates a natural language representation of the sound signal from the latent variable and a condition concerning an index for the natural language representation using a decoder, wherein the data generation apparatus comprises a neural network, and the neural network processes the sound signal in time series form as input and outputs the natural language representation in textual form.

11. A data generation model learning apparatus comprising:
a learning circuitry configured to perform learning a data generation model using first learning data,
wherein the first learning data comprises data of a first domain and data of a second domain corresponding to the data of the first domain, and an index for the data of the second domain,
the learning the data generation model further comprises updating one or more parameter values of one or more layers in a neural network,
the neural network processes the data of the first domain in time-series form as input and outputs the data of the second domain,
the data generation model comprises an encoder and a decoder,
the encoder generates a latent variable corresponding to data of the first domain from the data of the first domain,
the decoder generates data of the second domain corresponding to the data of the first domain from the latent variable and a condition concerning an index for the data of the second domain,
the latent variable represents a feature of data of the first domain corresponding to the data of the first domain in multi-dimensional vector form, and
the learning the data generation model further comprises outputting an updated neural network model.

12. A data generation apparatus comprising:
a latent variable generation circuitry configured to generate, from data of a first domain, a latent variable corresponding to the data of the first domain using an encoder, and the latent variable representing a feature of data of the first domain corresponding to the data of the first domain in multi-dimensional vector form; and
a second domain data generation circuitry configured to generate data of a second domain corresponding to the data of the first domain from the latent variable and a condition concerning an index for the data of the second domain using a decoder, wherein the latent variable generation circuitry and the second domain data generation circuitry comprises a neural network, and the neural network processes the data of the first domain in time series form as input and outputs the data of the second domain.

13. A data generation model learning method comprising:
a learning step in which a data generation model learning apparatus performs learning of a data generation model using first learning data,
wherein the first learning data comprises data of a first domain, data of a second domain corresponding to the data of the first domain, and an index for the data of the second domain
the learning of the data generation model further comprises updating one or more parameter values of one or more layers in a neural network,
the neural network processes the data of the first domain in time-series form as input and outputs the data of the second domain,
the data generation model comprises an encoder and a decoder,
the encoder generates a latent variable corresponding to data of the first domain from the data of the first domain,
the decoder generates data of the second domain corresponding to the data of the first domain from the latent variable and a condition concerning an index for the data of the second domain, and
the latent variable represents a feature of data of the first domain corresponding to the data of the first domain in multi-dimensional vector form, and
the learning of the data generation model further comprises outputting an updated neural network model.

14. A data generation method comprising:
a latent variable generation step in which a data generation apparatus generates a latent variable corresponding to data of first domain from the data of a first domain using an encoder,
wherein the latent variable represents a feature of data of the first domain corresponding to the data of the first domain in multi-dimensional vector form; and
a second domain data generation step in which the data generation apparatus generates data of a second domain corresponding to the data of the first domain from the latent variable and a condition concerning an index for the data of the second domain using a decoder,
wherein the data generation apparatus comprises a neural network, and the neural network processes the data of the first domain in time series form as input and outputs the data of the second domain.

* * * * *

UNITED STATES PATENT AND TRADEMARK OFFICE
CERTIFICATE OF CORRECTION

| | | |
|---|---|---|
| PATENT NO. | : 12,087,274 B2 | Page 1 of 1 |
| APPLICATION NO. | : 17/612202 | |
| DATED | : September 10, 2024 | |
| INVENTOR(S) | : Kashino et al. | |

It is certified that error appears in the above-identified patent and that said Letters Patent is hereby corrected as shown below:

On the Title Page

Item (73) Assignee: reading:
-NIPPON TELEGRAPH AND TELEPHONE CORPORATION Tokyo (JP)-

Should read:
--NIPPON TELEGRAPH AND TELEPHONE CORPORATION Tokyo (JP); The University of Tokyo Tokyo (JP)--

Signed and Sealed this
Eleventh Day of February, 2025

Coke Morgan Stewart
*Acting Director of the United States Patent and Trademark Office*